(12) United States Patent
Denoual et al.

(10) Patent No.: US 9,939,213 B2
(45) Date of Patent: Apr. 10, 2018

(54) HEAT EXCHANGER WITH AN ADAPTER UNIT FIXED TO AN ENDPLATE, AND ASSOCIATED METHOD OF MANUFACTURE

(71) Applicant: VALEO SYSTEMS THERMIQUES, Le Mesnil Saint Denis (FR)

(72) Inventors: Christophe Denoual, Noyen sur Sarthe (FR); Alain Pourmarin, La Suze s/Sarthe (FR); Frédéric Tison, Guecelard (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 13 days.

(21) Appl. No.: 14/904,971

(22) PCT Filed: Jul. 4, 2014

(86) PCT No.: PCT/EP2014/064378
§ 371 (c)(1),
(2) Date: Jan. 14, 2016

(87) PCT Pub. No.: WO2015/007550
PCT Pub. Date: Jan. 22, 2015

(65) Prior Publication Data
US 2016/0146553 A1    May 26, 2016

(30) Foreign Application Priority Data
Jul. 19, 2013 (FR) .................... 13 57162

(51) Int. Cl.
*F28F 3/00*     (2006.01)
*F28F 9/18*     (2006.01)
(Continued)

(52) U.S. Cl.
CPC .............. *F28F 9/182* (2013.01); *B23P 15/26* (2013.01); *F28D 9/005* (2013.01); *F28D 9/0037* (2013.01);
(Continued)

(58) Field of Classification Search
CPC ........ F28F 9/0278; F28F 9/182; F28F 9/0251; F28F 9/0253; F28F 2275/122; F28D 7/1684; F28D 9/005; B23P 15/26
(Continued)

(56) References Cited

U.S. PATENT DOCUMENTS 4,487,038 A    12/1984  Iijima
6,892,805 B1 *  5/2005  Valensa ................ F28F 9/0278
                                                      165/173

(Continued)

FOREIGN PATENT DOCUMENTS

JP    H11101591    4/1999

*Primary Examiner* — Davis Hwu
(74) *Attorney, Agent, or Firm* — Duane Morris LLP; Gregory M. Lefkowitz; Jason M. Nolan

(57) ABSTRACT

The present invention relates to a heat exchanger comprising a bundle for the exchange of heat between fluids, an endplate of said bundle provided with orifices for the distribution of fluid through the bundle, and an adapter unit with an external fluid circuit having one or more fluid-distribution ducts corresponding with one of said or with said distribution orifices of the endplate and being fixed by one face to the endplate, characterized in that the endplate comprises at least one semi-cutout held by crimping in a housing formed in the face of the unit in contact with the plate.

6 Claims, 2 Drawing Sheets

(51) Int. Cl.
*F28F 9/02* (2006.01)
*F28D 9/00* (2006.01)
*B23P 15/26* (2006.01)

(52) U.S. Cl.
CPC .......... *F28F 9/0251* (2013.01); *F28F 9/0253* (2013.01); *F28F 2275/122* (2013.01)

(58) Field of Classification Search
USPC ........................................................ 165/166
See application file for complete search history.

(56) References Cited

U.S. PATENT DOCUMENTS

| | | |
|---|---|---|
| 2009/0205814 A1 | 8/2009 | Kume |
| 2010/0243200 A1 | 9/2010 | Baker, Jr. |
| 2011/0168370 A1* | 7/2011 | Garret .................. F28D 7/1684 165/158 |
| 2011/0303402 A1 | 12/2011 | Gu et al. |
| 2013/0200611 A1 | 8/2013 | Lemee et al. |
| 2014/0020866 A1 | 1/2014 | Bluetling et al. |
| 2014/0151006 A1 | 6/2014 | Moreau et al. |

* cited by examiner

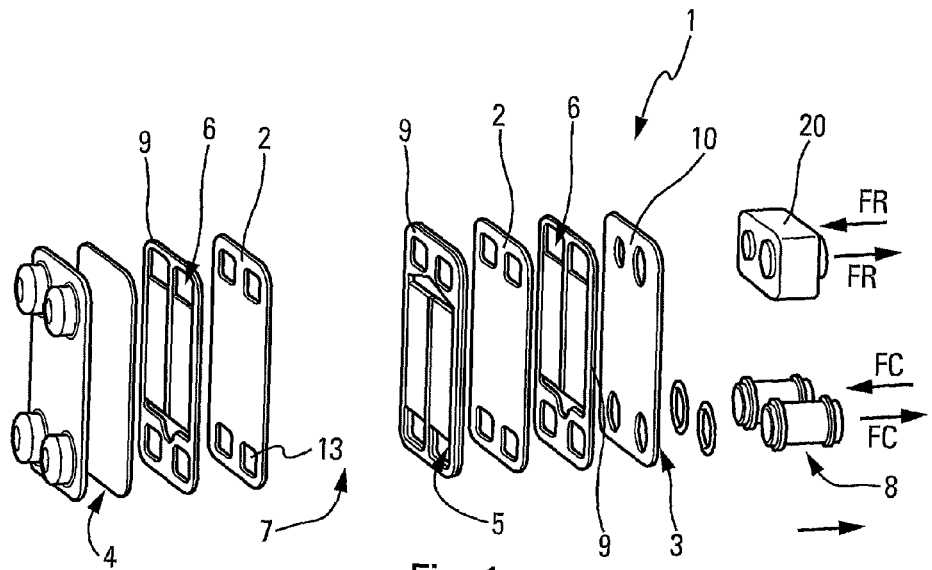
Fig. 1
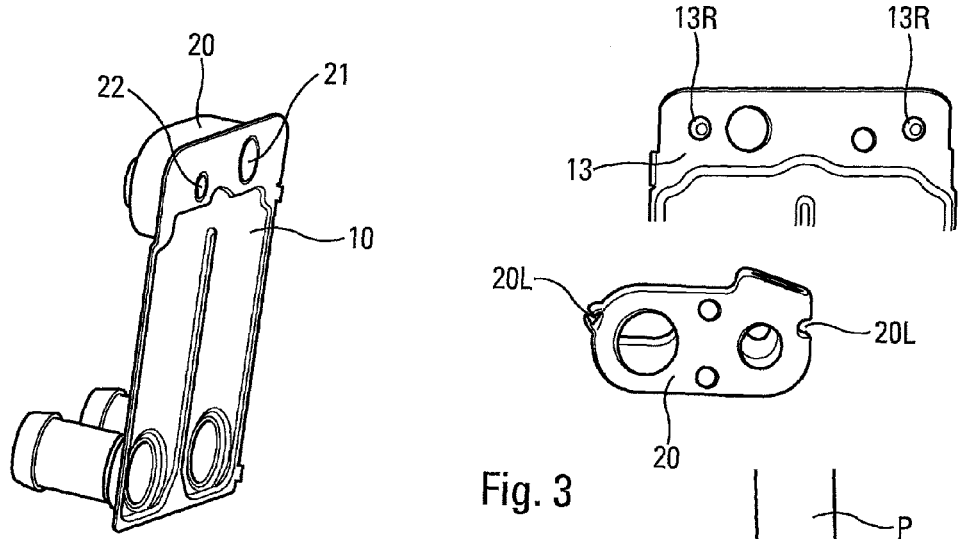
Fig. 2
Fig. 3
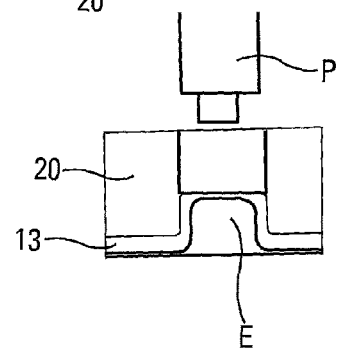

HEAT EXCHANGER WITH AN ADAPTER UNIT FIXED TO AN ENDPLATE, AND ASSOCIATED METHOD OF MANUFACTURE

CROSS-REFERENCE TO RELATED APPLICATIONS

This application is a § 371 national stage entry of International Application No. PCT/EP2014/064378, filed Jul. 4, 2014, which claims priority to French Patent Application No. 1357162 filed Jul. 19, 2013, the entire contents of which are incorporated herein by reference.

The present invention relates to the field of heat exchangers and is notably directed to that of exchangers used in automobile vehicles, more particularly to that of exchangers used in air-conditioning loops and/or for managing the temperature of electric, batteries.

Heat exchangers covered with two fluids are known: a coolant fluid and a heat transfer fluid, the first cooling the second.

The exchangers intended for this use consist of a plurality of components which after assembling form a bundle in which fluids circulate.

During manufacturing, the components of the bundle are generally pre-assembled in different elements within the scope of assembling operations, before being sealably secured by brazing in a single step, for example by passing in an oven.

FIG. 1 illustrates an example of an exchanger of this type in an exploded view. It is intended to ensure heat transfer between a first fluid, notably a heat transfer fluid such as glycolated water and a second fluid, which may be a coolant, a gas, a diphasic substance or liquid. The exchanger comprises a plurality of plates 5 and 6 stacked along a longitudinal direction. The plates form channels covered by the first fluid and by the second fluid, the channels for the first fluid alternating with the channels for the second fluid in the stacking direction of the plates.

At one end 3 of the bundle, the latter is delimited by an end plate 10 putting the bundle in communication with circulation circuits of the first and second fluid, by means of a connecting device 8, here formed with two pipes, for the heat transfer fluid FC, and a bracket 20 for the coolant fluid FR.

This last element forms a massive metal block, for example in an aluminium alloy, which is used for connecting a component of the coolant fluid circuit, not shown in the figure, to the exchanger. It is machined and is crossed by two conduit elements, designated subsequently in the present application by distribution conduits, each communicating on one face in which they open with a corresponding orifice pierced in the end plate 10.

During manufacturing, the problem of the connection before brazing and of the maintaining of the adaptor block 20 to the end plate 10 is posed. FIG. 2 shows this pre-assembled assembly of parts.

Various solutions to this problem may be contemplated.

First of all, it is possible to ensure the maintaining of the two components by an outer contraction such as a strapping, a support on a brazing chair. This solution is not however applicable when the assembly is a sub-assembly which will itself be assembled with other components.

It is also possible to deform one of the components on the other. For example with reference to FIG. 2, the block 20 may be connected to the plate by a deformation operation aiming at flaring at least one of the conduits 21 or 22 of the block at the corresponding aperture of the end plate. This solution is however difficult to apply in practice, because of the small diameter of one of the channels, of the order of 5 mm, which does not allow flaring.

It is further possible to carry out clinching between both components. This operation consists of locally deforming the end plate 13, so as to form rivets 13R on the latter on the one hand and of machining receiving housings 20L of the rivets of the plate in the adaptation block on the other hand. In FIG. 3, it is seen that these housings are made with side protrusions relatively to the block. These protrusions are through-protrusions. Next, both parts are assembled by engaging the rivets into their respective housing on the block. Finally the bottom of the rivet of the plate is crushed in the whole of the block between an anvil E on one side and a punch P on the other. This succession of operations is illustrated by FIG. 3.

This solution, although it may be contemplated industrially, has several drawbacks.

A free area has to be provided on the plate for producing raised/recessed portions and side extrusions for housing the rivets. The result of this is an increase in the congestion of the adaptation block, of the weight and of the cost of the component.

Further, the application of this technique implies additional passes over the stamping tool which implies an additional component cost.

An access further has to be provided for clinching the adaptation block. This implies an increase in the size of the adaptation block, of the weight and of the component cost.

It should also be noted that the material is thinned after clinching. A risk of reduction in the resistance to external corrosion ensues in this area.

Another solution would be to carry out punching between both components. In this operation, the rivets are machined in the adaptation block and corresponding orifices are pierced in the plate. Both elements are assembled with introduction of the rivets into the orifices of the plate and then the rivets are deformed so as to immobilize the plate between the deformed ends of the rivets and the face of the block in contact with the plate. This solution has the drawback of requiring specific raised/recessed portions on the adaptation block which implies an increase in the size of the adaptation block, in the weight and in the component cost. Further it induces a risk of an external leak.

The object of the invention is the development of an assembling method for a plate and an adaptation block or bracket which does not have the drawbacks of the solutions shown above.

Thus the invention deals with a heat exchanger comprising a heat exchange bundle between fluids, an end plate of said bundle, said plate being provided with orifices for distributing fluid in the bundle, and a block for adaptation to an external fluid circuit, having fluid distribution conduit(s) mating one of said distribution orifices of the end plate, and being attached through one face to the end plate.

According to the invention, the end plate comprises at least one partial cut maintained by crimping in a housing made, notably machined or cold-forged, in the face of the blocking contact with the plate.

The term of partial cut means that the metal sheet in which the plate is made is cut out so as to form a tab connected to the plate through only one portion of the contour of said tab. As an example, said tab is of a polygonal shape, notably rectangular, retained by one side to the plate. The tab is parallel relatively to the surface of the plate and protrudes. This may be a slashed stamp.

The solution of the invention gives the possibility of overcoming the drawbacks of the techniques mentioned above. Thus, the crimping operation by a partial cut gives the possibility of using the block as an anvil, by benefiting from its massive feature. Further, areas of the plate which would be thinned and weakened are not generated.

According to an advantageous embodiment, the partial cut and its associated housing are made at the periphery of one of the distribution orifices.

This arrangement of the partial cut gives the possibility of not exposing the connecting area to external corrosion.

Said partial cut may advantageously extend, notably radially from the periphery of one of the orifices so as to be found outside the passage between said bundle and said block. Thus, by ensuring that the partial cut does not extend into the hydraulic section of the orifice, the flow of the fluid through the latter is not perturbed.

Preferably, the plate comprises two so called fluid distribution orifices associated to said two distribution conduits on the adaptation block, and a said partial cut is crimped in a said housing at the periphery of each of both orifices.

The invention finds a particular application in a heat exchanger, for which the heat exchange bundle is made by stacking plates making between them conduits for circulation of each of the fluids.

More particularly, said orifices are laid out, one for supplying the fluid, the other one for the return of the fluid after heat exchange.

This may advantageously be an exchanger intended for heat exchange between a heat transfer liquid and a coolant fluid, i.e. a fluid capable of changing phase during exchange of heat.

The applicant also intends to cover an end plate associated with an adaptation block for an exchanger as mentioned above, i.e., an assembly of a plate and of an adaptation block in which the plate comprises at least one partial cut and the adaptation block comprises a housing for which the shape and the position are matched to the partial cut.

More particularly, the invention deals with an end plate associated with an adaptation block, for which the partial cut is made at the periphery of an orifice laid out for distributing fluid in the bundle, by not extending into the hydraulic section of the orifice.

The invention also deals with a method for attaching an adaptation block with at least one fluid distribution conduit on an end plate of a heat exchanger, the method comprising a step for setting the block into place and for maintaining it on the plate in preparation for their brazing. The method is characterized by the fact that a partial cut is made in the plate and a housing, notably a counter-bore, is made in the block with a shape corresponding to that of the partial cut, the maintaining being obtained by crimping of the partial cut of the plate in the housing of the block.

Said housing is formed, for example by machining or cold stamping and said partial cut (110, 120) is notably formed by stamping and lancing.

Said partial cut is advantageously obtained by the same operation as the operation giving the possibility of obtaining the fluid distribution orifice(s) provided on the latter.

More particularly, the associated partial cut and housing are made at the periphery of said fluid distribution orifice(s).

Advantageously, said block is used as an anvil during the crimping of the plate on said block.

Other features and advantages will become apparent upon reading the detailed description of a non-limiting embodiment of the invention, with reference to the drawings wherein:

FIG. 1 shows an exploded view of an example of a heat exchanger to which applies the invention;

FIG. 2 shows a perspective view of an assembly formed with an adaptation block and an end plate of a heat exchanger bundle;

FIG. 3 shows a perspective and sectional view of a known connecting technique by clinching of an adaptation block with an end plate of a heat exchanger;

The invention relates to a heat exchanger, an exemplary embodiment of which has already been mentioned above in connection with FIG. 1.

Figure 4:
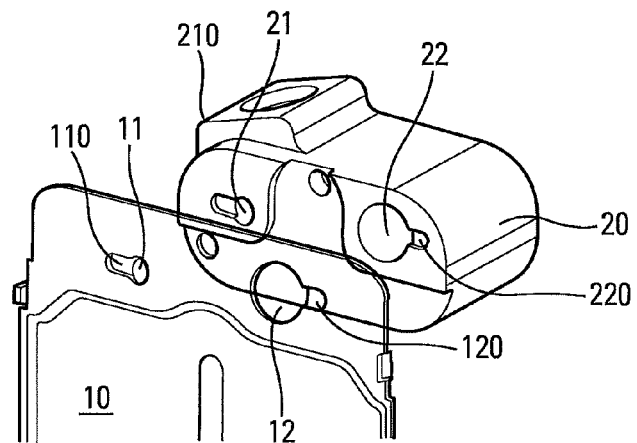
FIG. 4 shows a perspective view of an end plate and of an adaptation block in position for being assembled according to the invention.

FIG. 4 shows an exemplary end plate 10 of said exchanger. Only the portion in proximity to both orifices 11 and 12 for distributing fluid is illustrated. A partial cut, 110 and 120 respectively, is made at the periphery of both distribution orifices. A so called metal, for example aluminium, adaptation block 20 is pierced with two conduits 21, 22 which open onto a face of the block, the one intended to be placed against the end plate. This block is laid out so as to allow the connection of conduits of an external circuit to the exchanger. The block is conformed so as to be able to be placed facing the end plate in a position where both opening conduits 21 and 22 of block 20 are aligned with the corresponding distribution orifices 11 and 12 on the end plate. Housings 210 and 220 were machined in the face of the block located on the side of the plate and are laid out so as to receive the partial cuts of the end plate. The housings may also be made by a cold stamping method, notably by extrusion impact.

Figure 6:
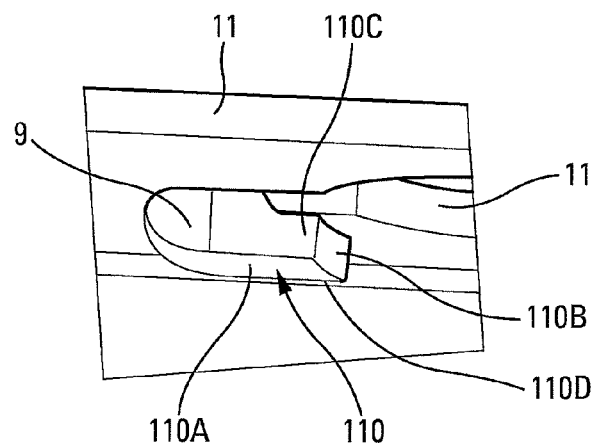
FIG. 6 shows a perspective view of the detail of a partial cut made on the end plate.

As this is seen in detail in FIG. 6, a partial cut 110, 120 respectively, comprises a tab 110*a*, parallel to the plane of the plate. This tab 110*a* is here of an elongated shape, for example substantially rectangular. It is free on three sides 110*b*, 110*c*, 110*d* while being attached to the plate on a portion comprising the fourth side 110*f*. The free side 110*b*, opposite to the fourth side 110*f* is set back relatively to the periphery of the orifice 110 with which the tab is associated. It may be in the extension of the edge of the orifice but preferably it is conformed so as to not come and perturb the flow of the fluid through the orifice. In the figure, this side is curvilinear. The partial cut was made in a step before the assembling step, by means of a stamping and cutting tool with a shape corresponding to that of the distribution orifice 11 to be formed and of the tab to be obtained.

The housings 210 and 220 made in the block have a shape corresponding to the contour of the tab which they should receive, with a slight side play. Their depth is sufficient so that the plate may bear against the contact face of the block, when the tabs are introduced into the housings.

Figure 5:
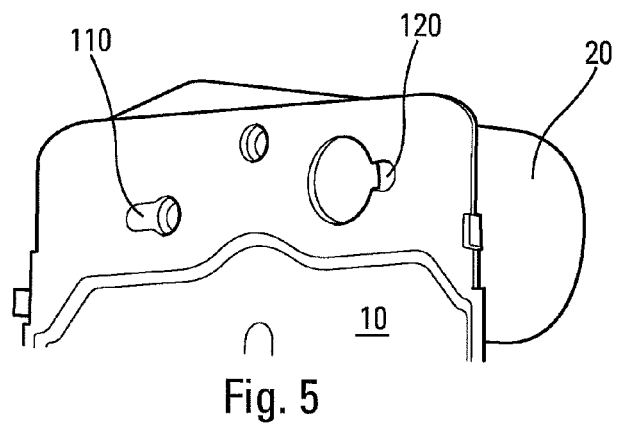
FIG. 5 shows a perspective view of an adaptation block and of an end plate bound to each other according to the invention.

FIG. 5 shows a thereby assembled end plate and adaptation block. The partial cuts are made at the periphery of both orifices while being opposite so as to ensure optimum resistance to stripping of the tabs relatively to their housing.

In order to ensure the hold of the assembly, a punch is introduced into the cavity of the partial cut and crimping pressure is exerted by means of the punch until a portion of the material of the tab will flow against the side faces of the housing. Because of the massive nature of the block, the bottom of the housing forms an anvil against which the punch may be pressed. The connection of the tab with the walls of the housing, thereby obtained, has a sufficient strength for resisting the possible pull-off forces to which it may be subject during the different handling operations until the brazing of the assembly of the components of the exchanger in an oven.

This assembling method was achieved on a metal sheet forming an end plate of an exchanger. The metal sheet may have a thickness from 0.5 to 2 mm, notably 1 mm. The orifices may have a diameter of less than 20 mm, such as a diameter of 5 and 11 mm respectively. They may be spaced apart by 10 to 100 mm, notably 46 mm. The tabs from the partial cutting of the metal sheet, may have an outer face parallel to the plate at a distance from 0.5 to 5 mm, notably 1.5 mm.

The invention claimed is:

1. A heat exchanger comprising:
   a bundle for heat exchange between fluids,
   an end plate of said bundle, said end plate being provided with one or more fluid distribution orifices in the bundle, and
   an adaptation block for adapting to an external fluid circuit, comprising fluid distribution conduit(s) matching the one or more distribution orifices of the end plate, and being attached through one face to the end plate,
   wherein the end plate comprises at least one partial cut maintained by crimping in a housing made in the face of the block in contact with the plate,
   wherein the partial cut and its associated housing are respectively located at the periphery of the one or more distribution orifices and its associated distribution conduit, and said partial cut extends from the periphery of the one or more distribution orifices so as to be found outside the passage between said bundle and said adaptation block.

2. The heat exchanger according to claim 1, wherein said housing is a machined or cold-stamped housing.

3. The heat exchanger according to claim 1, wherein said partial cut is a slashed stamp of said end plate.

4. The heat exchanger according to claim 1, wherein said partial cut is oriented radially relative to said one or more distribution orifices.

5. The heat exchanger according to claim 4, wherein the end plate comprises two fluid distribution orifices associated with two distribution conduits of the adaptation block, and wherein a housing at the periphery of each of both orifices and conduits comprises a partial cut crimped therein.

6. The end plate associated with an adaptation block for an exchanger according to claim 1.

* * * * *